United States Patent
De Vera et al.

(10) Patent No.: US 9,944,746 B2
(45) Date of Patent: Apr. 17, 2018

(54) PROCESS FOR MAKING ORGANIC-INORGANIC HYBRID MATERIALS

(71) Applicants: Antonio De Vera, Avon Lake, OH (US); Garth Olszko, Brecksville, OH (US)

(72) Inventors: Antonio De Vera, Avon Lake, OH (US); Garth Olszko, Brecksville, OH (US)

(73) Assignee: MOMENTIVE PERFORMANCE MATERIALS INC., Waterford, NY (US)

(*) Notice: Subject to any disclaimer, the term of this patent is extended or adjusted under 35 U.S.C. 154(b) by 0 days.

(21) Appl. No.: 14/360,481

(22) PCT Filed: Nov. 23, 2012

(86) PCT No.: PCT/US2012/066448
§ 371 (c)(1),
(2) Date: May 23, 2014

(87) PCT Pub. No.: WO2013/078450
PCT Pub. Date: May 30, 2013

(65) Prior Publication Data
US 2014/0371386 A1    Dec. 18, 2014

Related U.S. Application Data

(60) Provisional application No. 61/563,257, filed on Nov. 23, 2011.

(51) Int. Cl.
*C08G 77/06* (2006.01)
*C08G 18/71* (2006.01)
(Continued)

(52) U.S. Cl.
CPC ....... *C08G 18/718* (2013.01); *C08G 18/0852* (2013.01); *C08G 18/242* (2013.01);
(Continued)

(58) Field of Classification Search
CPC ........ C08G 77/18; C08G 77/26; C08G 77/44; Y10T 428/2982
See application file for complete search history.

(56) References Cited

U.S. PATENT DOCUMENTS

| 4,017,528 A | * | 4/1977 | Unger | .................... | C08G 77/02 |
| | | | | | 502/150 |
| 4,485,130 A | * | 11/1984 | Lampin | .................. | C03C 1/008 |
| | | | | | 427/372.2 |

(Continued)

FOREIGN PATENT DOCUMENTS

| EP | 1630209 A1 | 3/2006 |
| WO | 2010083041 A1 | 7/2010 |

OTHER PUBLICATIONS

International Search Report and Written Opinion of the International Searching Authority, PCT/US2012/066448, dated Feb. 5, 2013.

*Primary Examiner* — Margaret G Moore
(74) *Attorney, Agent, or Firm* — Joseph Waters; McDonald Hopkins LLC

(57) ABSTRACT

A process for forming an organic-inorganic hybrid material that can undergo a property change when exposed to an external stimulus, the process comprising providing a prepolymer; and attaching a functional organometal material to the prepolymer, where the functional organometal material comprises a functional moiety that is responsive to an external stimulus such that the organic-inorganic hybrid material exhibits a change in a property of the organic-inorganic hybrid material. The process can further include (Continued)

forming hydrogel particles from the organic-inorganic hybrid material.

54 Claims, 9 Drawing Sheets

(51) Int. Cl.
    *C08G 77/26*     (2006.01)
    *C08L 83/08*     (2006.01)
    *C08G 18/08*     (2006.01)
    *C08G 18/24*     (2006.01)
    *C08G 18/48*     (2006.01)
    *C08J 3/075*     (2006.01)
    *C08G 77/38*     (2006.01)
    *C08G 77/46*     (2006.01)

(52) U.S. Cl.
    CPC ......... *C08G 18/4833* (2013.01); *C08G 77/26* (2013.01); *C08G 77/38* (2013.01); *C08G 77/46* (2013.01); *C08J 3/075* (2013.01); *C08L 83/08* (2013.01); *C08J 2375/08* (2013.01); *Y10T 428/2982* (2015.01)

(56) References Cited

U.S. PATENT DOCUMENTS

| | | | |
|---|---|---|---|
| 4,597,800 A | | 7/1986 | Turner |
| 5,013,585 A | * | 5/1991 | Shimizu ................. B82Y 30/00 427/215 |
| 6,686,035 B2 | * | 2/2004 | Jiang ..................... B01J 20/103 210/198.2 |
| 6,921,576 B2 | * | 7/2005 | Terauchi ............. C08G 18/283 106/287.11 |
| 2008/0248289 A1 | * | 10/2008 | Jonschker ............. B82Y 30/00 428/328 |
| 2009/0274842 A1 | | 11/2009 | Sawada et al. |
| 2010/0016488 A1 | | 1/2010 | Karkkainen |
| 2010/0155644 A1 | * | 6/2010 | Ou ........................ C01B 33/155 252/62 |
| 2010/0216925 A1 | * | 8/2010 | Yano ............................. 524/178 |
| 2010/0145001 A1 | | 10/2010 | Findlay et al. |
| 2011/0004010 A1 | | 1/2011 | Onozawa et al. |
| 2011/0178240 A1 | | 7/2011 | Acevedo et al. |
| 2012/0085261 A1 | * | 4/2012 | Barbe ................... C09D 5/082 106/14.42 |
| 2013/0129633 A1 | * | 5/2013 | Sharma ............. A61K 41/0052 424/9.32 |

* cited by examiner

*FTIR of Urethane of polyethylene glycol methyl ether gamma propyl trimethoxysilane*

PROCESS FOR MAKING ORGANIC-INORGANIC HYBRID MATERIALS

CROSS-REFERENCE TO RELATED APPLICATIONS

This application is a 35 U.S.C. 371 national stage filing and claims priority to PCT Application No. PCT/US2012/66448, entitled "Process for Making Organic-Inorganic Hybrid Materials" filed on Nov. 23, 2012, which claims the benefit of U.S. Provisional Application No. 61/563,257 entitled "Process for Making Organic-Inorganic Hybrid Materials" filed on Nov. 23, 2011, both of which are incorporated herein in their entirety by reference.

FIELD OF THE INVENTION

The present invention relates to functionalized organic-inorganic hybrid materials. In particular, the present invention provides functionalized materials that can be stimuli responsive that can exhibit a change in a property of the organic-inorganic hybrid material in response to an external stimulus. The present invention also relates to methods of making such materials.

BACKGROUND

Materials that are responsive to changes in the conditions in a medium to which it is exposed but yet do not fall apart when subjected to such changing conditions are difficult to synthesize. These materials include a variety of polymeric materials which may use adaptive cross-linkers that can modulate the response to changes in the environment and can exhibit observable or measurable properties such as swelling when soaked in a particular liquid. For example, DNA (a special block co-polymer) is used as a reversible cross-linker in a hydrogel (hydrophilic polymers) that can modulate the mechanical and rheological properties of the hydrogel and at the same time, it can selectively bind a variety of biological molecules. Liu, Juewen, "Oligonucleotide-functionalized hydrogels as stimuli responsive materials and biosensors," Soft Matter, 2011, 7, 6757-6767. Such properties are useful in controlled drug delivery systems, protein separations and biological sensors.

For materials that involve non-carbon based polymeric materials such as those found in ceramic types, e.g., metal oxides, few, if any, are available as responsive materials that involve conformational changes. This is especially true when it involves swelling in several media. More problematically, to successfully synthesize such materials that rely on organometals that have different moieties is not straightforward because reactivity is different for different organometals. For example as described in U.S. Utility patent application Ser. No. 12/701,862 "Method for Making High Purity Metal Oxide Particles and Materials Thereof," which is incorporated by reference herein in its entirety, inserting titania or titanium oxide in an amorphous silica particle using condensation of the precursor organosilanes such as tetramethoxysilane or tetraisopropyl ortho titanate is not straightforward. This is due to differences in the degree of reactivity between the two. Therefore, the '862 application addressed this by balancing the feed of the silicon metal precursor versus the titanium metal precursor that prevents the premature gellation of titanium versus silicon; resulting in a single phase product rather than distinct separate titania and silicate phases.

On the other hand, organic-inorganic hybrid materials having different moieties of two different precursor sources, especially those that concerns organic moieties such as those found in several organosilanes, will have similar difficulty in successfully reacting so that one precursor is a part of the other without having both form as separate entities. These are concerns to successfully produce organic-inorganic hybrids that have special stimuli sensitivity to temperature, pH, etc. and responses such as physically swelling in a media or changes in electrical or optical characteristics, etc.

SUMMARY

In one aspect, the present invention provides a method and process for forming functionalized organic-inorganic hybrid materials. In one aspect, the present invention provides a process for producing functionalized metal oxide or hydroxide particles. In another aspect, the present invention provides a process for producing metal oxide hydrogel particles functionalized with a polyethylene glycol moiety. In one aspect, the present invention provides a process for producing silica hydrogel particles functionalized with polyethylene glycol moieties.

In one aspect, the present invention provides a method for forming functionalized organic-hybrid materials that exhibit a change in a property of the material upon exposure to an external stimulus such as, for example, upon exposure to a particular medium or upon a change in a property or condition of the medium.

In one embodiment, the process comprise forming a prepolymer backbone, attaching a functional organometal material to the prepolymer backbone to form a precursor material, and forming a hydrogel by reacting the precursor material in a water containing solution to form particles having the desired structure and morphology.

In one aspect, the present invention provides a process for forming an organic-inorganic hybrid material that can undergo a property change when exposed to an external stimulus, the process comprising providing a prepolymer; and attaching a functional organometal material to the prepolymer, where the hybrid material comprises a functional moiety and is responsive to an external stimulus.

In one embodiment, providing the prepolymer comprises forming the prepolymer by adding a metal source to a reaction system comprising water, a first catalyst, and an oxygenated material, and reacting the mixture.

In one embodiment, the first catalyst is chosen from hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof; and the oxygenated material is chosen from a primary alcohol, a secondary alcohol, or tertiary alcohol comprising one to eight carbon atoms; a hindered alcohol; a cyclic alcohol; methyltertiarybutylether, a substituted alcohol; a diol; tetrahydrofuran; pyrrolidone; a substituted pyrrolidone; dimethyl sulfoxide; furfural; or a combination of two or more thereof.

In one embodiment, attaching the functional organometal material to the prepolymer comprises adding the functional organometal material and water to a solution comprising the prepolymer. In one embodiment, the functional organometal material is added to the solution comprising the prepolymer at a rate such that the organometal functional material does not self condense.

In one embodiment, the grafting is carried out at a temperature of from about 15° C. to about 50° C.

In one embodiment, the process comprises forming an organic-inorganic hybrid particle by reacting the organic-inorganic hybrid material in a solution comprising water and a base catalyst.

In one embodiment, the organic-inorganic hybrid material, the water of the solution comprising water and the base catalyst, or both comprise a non-ionic or ionic surfactant.

In one embodiment, the surfactant comprises a polyglycol, an alkylene oxide, a cyclic hydrocarbon, a linear or branched aliphatic hydrocarbon having carbon numbers from 5 to 12 and alkyl derivatives thereof, or combinations of two or more thereof or a combination thereof.

In one embodiment, the process comprises adding a highly polar material to organic-inorganic hybrid material, the water of the solution comprising water and the base catalyst, or both. In one embodiment, the highly polar material is chosen from a cycloaliphatics, a linear and/or branched aliphatic from 3-12 carbons atoms, an aromatic, an alkylated aromatic, a cyclic alkenes, a cyclic alkane, or a combination of two or more thereof.

In one embodiment, the base catalyst comprises a non-alkaline metal base material, an organic base material, a non-metal base material, or a combination of two or more thereof. The non-alkaline metal bases can include ammonium hydroxide, an aqueous solution of ammonium carbonate, an aqueous solution of ammonium bicarbonate, a quaternary alkyl ammonium hydroxide, a hydroxylamine and an organic hydroxylamines, or a combination of two or more thereof.

In one embodiment, the process comprises subjecting the organic-inorganic hybrid material to temperature and pressure conditions to remove volatile components from the material prior to particle formation.

In another aspect, the present invention provides a process for forming an organic-inorganic hybrid material that exhibits a property change in response to an external stimulus, the process comprising (a) forming a metaloxo polymer by adding a metal source to a solution comprising a water, an oxygenated material, and a first catalyst and reacting the components in the solution, the metaloxo polymer comprising a reactive site on the polymer chain; and (b) grafting a functional moiety to the polymer by reacting a functional organmetal material with the polymer via the reactive sites on the polymer chain.

In one embodiment, the metal source comprises a metal alkoxide, a hydrolyzable organometallic compound, oxo metal oligomers, or mixtures of two or more thereof. In one embodiment, the metal source and organometal material individually comprise a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

In one embodiment, the solution in (a) further comprises a non-polar material chosen from a linear or branched aliphatic hydrocarbon, a cyclic hydrocarbon, an aromatic hydrocarbon, a substituted aromatic hydrocarbon, or a combination of two or more thereof. In one embodiment, the non-polar material comprises cyclopentane, cyclohexane, cyclooctane, a linear or branched aliphatic hydrocarbon having 5 to 12 carbon atoms and alkyl derivatives thereof, or a combination of two or more thereof.

In one embodiment, the functional moiety comprises an organometal material comprising (a) a metal component comprising a metal atom comprising a labile leaving group attached to the metal, and (b) an organic functional moiety attached to the metal of the metal component.

In one embodiment, the process comprises (c) reacting the organic-inorganic hybrid material in a solution comprising water and a base catalyst to form hydrogel particles.

In one embodiment, adding a highly polar material to organic-inorganic hybrid material, the water of the solution comprising water and the base catalyst, or both. In one embodiment, the highly polar material is chosen from a cycloaliphatics, a linear and/or branched aliphatic from 3-12 carbons atoms, an aromatic, an alkylated aromatic, a cyclic alkenes, a cyclic alkane, or a combination of two or more thereof.

In one embodiment, the solution of (c) has a pH of 2 to about 12. In one embodiment, the solution of (c) has a pH of at least 3 and a temperature of at least 2° C. In one embodiment, the solution of (c) has a pH of at least 7. In one embodiment, the solution of (c) has a pH of at least 7 and a temperature of at least 5° C.

In one embodiment, from about 2% to about 100% of the volatile components are removed from the material.

The present invention also provides hydrogel particles. In one embodiment, the hydrogel particles have a mono-modal particle size distribution of from about 1 micron to about 120 microns. In one embodiment, the hydrogel particles have a surface area of from about 5 $m^2$/gram to about 1000 $m^2$/gram; from about 20 $m^2$/gram to about 700 $m^2$/gram; even from about 100 $m^2$/gram to about 500 $m^2$/gram.

In one embodiment, the functional organometal material comprises a functional group that is responsive to an external stimulus such that the organic-inorganic hybrid material exhibits a change in a property of the organic-inorganic hybrid material upon exposure to the external stimulus. In one embodiment, the property change is swelling, light absorption, light reflection, index of refraction, electrical conductivity, or a combination of two or more thereof. In one embodiment, the property change results from exposure to an aqueous medium, a non-polar medium, or a polar medium. In one embodiment, the property change is in response to a change in the medium's concentration, pH, temperature, presence of a specific ion, or two or more thereof.

In one embodiment, the organic-inorganic hybrid material further comprises a crosslinker disposed therein. In one embodiment, the crosslinker is chosen from an acrylic, a urethane, an isocyanate, a vinyl, an epoxy, an oxirane, or a combination of two or more thereof.

In one embodiment, the particles comprise about 5 percent by weight or greater of organic material; even about 15 percent by weight or greater of organic material.

In one embodiment, the particles have an average pore size of from about 20 angstroms to about 2000 angstroms. In one embodiment, the particles comprise macropores of about 0.25 micron or greater.

DETAILED DESCRIPTION

Figure 1:
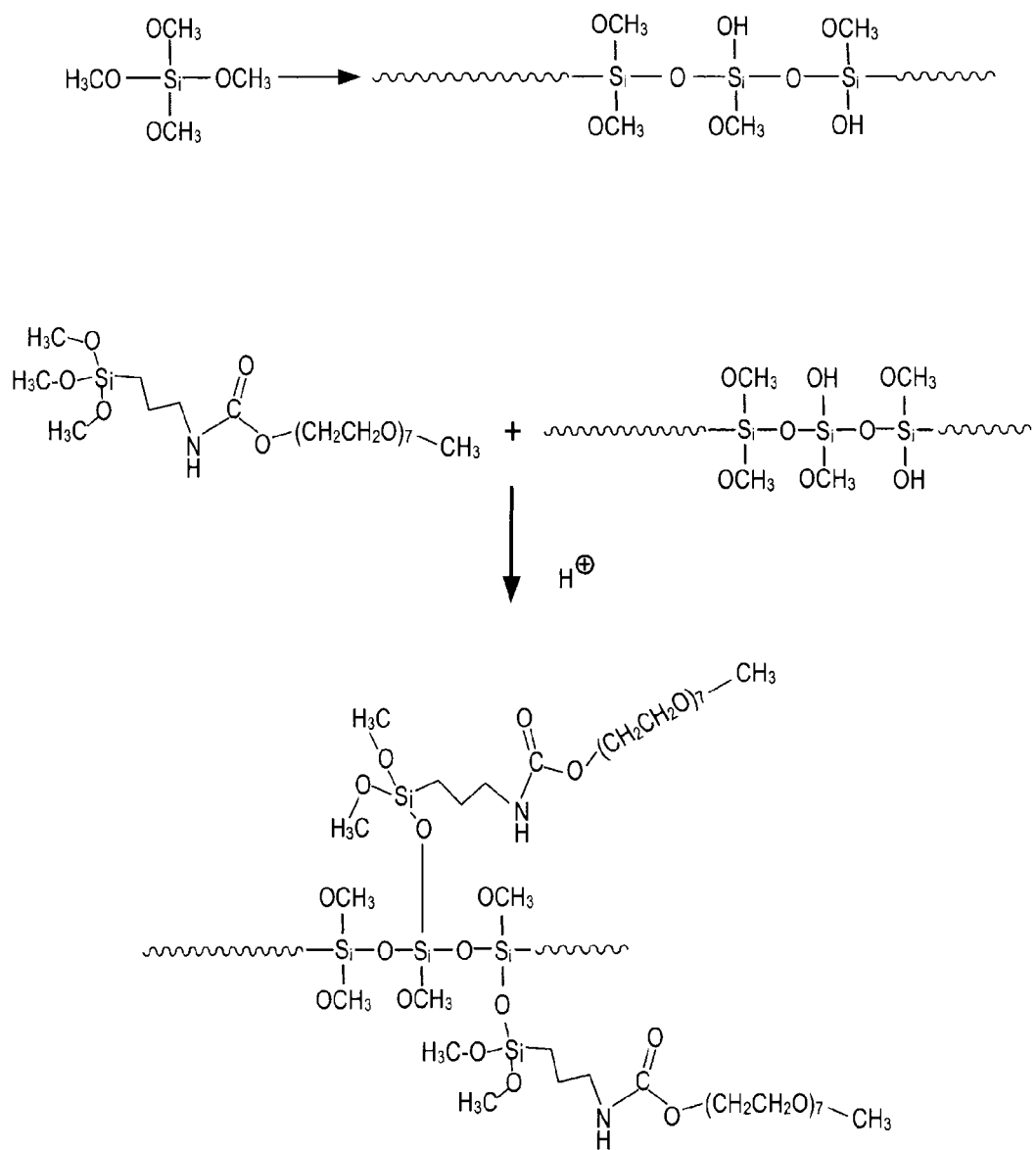
FIG. 1 is reaction scheme illustrating a process for forming a precursor material in an embodiment of the invention.

The present invention provides a process for forming functionalized organic-inorganic hybrid materials and optionally the formation of particles and the materials or particles formed by such processes. Generally, the process comprises (a) forming a prepolymer backbone; and (b) attaching a functional material to the prepolymer backbone to form a precursor material. This process can further comprise (c) reacting the precursor material in a water containing solution to form (hydro-)oxide hybrid particles. The formation of the precursor material can provide certain reaction products (e.g., alcohols, etc.) derived from leaving groups associated with the prepolymer and/or organometal material, which reaction products can be stripped off and removed from the system prior to particle formation. The particles may be formed in a two step process comprising forming a metaloxo oligomer precursor comprising a functional moiety in a first phase and forming metal oxide or hydroxide particles in a second phase.

The process can be used to provide a material that is a stimuli responsive material. In one embodiment, a stimuli responsive material is a material that can undergo a property change when exposed to an external stimulus. The property change is not particularly limited and can be structural, dimensional, optical, electrical, etc., or a combination of two or more thereof. In one embodiment, the organic-inorganic hybrid material swells, shrinks, exhibits a change in light absorption capability, light reflection, index of refraction, electrical conductivity, opacity, etc., or a combination of two or more thereof. The functional material attached to the polymer can provide the hybrid material with functionality that or modifies the material a stimuli responsive characteristic of the polymer.

While reference is made to metalloxanes, organo-metallic oxide or hydroxide materials and particles it will be appreciated that the process is not limited to making such particles and may be made to make organic-inorganic hybrids materials such as hydroxides, carbonates, phosphates, and mixed metal precursors.

Prepolymer Formation

The prepolymer can be provided by any suitable polymer material as desired for a particular purpose or intended use. The prepolymer is generally a metal containing material. The metal is not particularly limited. In one embodiment, the metal is chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof. In one embodiment, the prepolymer is a metalloxane polymer.

The prepolymer can be made by any suitable method. In one embodiment, forming the prepolymer comprises forming a metalloxo oligomer by adding a metal source to a solution comprising water, an oxygenated material, and a first catalyst. The hydrolysis/partial polymerization process is exothermic and the system will go through a maximum temperature before naturally cooling. The metal source is added at a controlled rate, and the reaction is allowed to equilibrate to 30° C. after the metal source addition is complete. A first surfactant is added to this solution and allowed to equilibrate. In one embodiment, the first surfactant may be a co-surfactant system. Upon equilibration of the system, this first phase comprises a metaloxo oligomer.

The metal source can include, for example, a metal alkoxide, a hydrolysable organometallic compound, oxo metal oligomers, or mixtures of two or more thereof. In on embodiment, the metal source is a metal alkoxide of the formula $M(OR)n$, where M is a metal, OR is an alkoxy group, and n is an integer less than or equal to the valence of the metal M. M can be chosen from any suitable metal including, but not limited to, Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

The metal oxide desired as a final product will determine the identity of the metal source. Thus, in one embodiment wherein synthetic silica is the desired product, the metal source is a silicon alkoxide or mixture of alkoxides where at least one of the alkoxides contains 2 hydrolyzable groups. Examples of silica sources include, but are not limited to, tetramethylorthosilicate (TMOS), tetraethylorthosilicate (TEOS), tetrapropylorthosilicate (TPOS), tetramethoxy silane, tetrabutoxy silane, methyl trimethoxy silane (MTMS), methyl triethoxy silane (MTES), phenyl trimethoxy silane, isobutyl trimethoxy silane, and higher tetraalkoxysilanes, siloxane oligomers derived from alkoxysilanes, and pre-polymerized alkoxysilanes such as polymethoxysiloxane so long as it is amenable to micelle formation, including a tetramer of polymethoxysiloxane such as methylsilicate. In one embodiment, the first phase has a selected molar ratio of water to siloxane oligomer derived from alkoxysilane to provide at least a siloxane heptamer, a cyclic siloxane, or mixtures thereof. A high purity silica source, such as alkoxysilane, can be obtained from a crude source such as those formed from the reaction of silicon metal with methanol in the presence of a metal catalyst such as copper and those exemplified in E. G. Rochow, "Methyl Silicate from Silicon and Methanol," Jl. Amer. Chem. Soc. 70, 2170-2171 (1948), U.S. Pat. Nos. 4,727,173, 4,999,446, and 5,084,590, which are incorporated by reference. Purification of alkoxysilane can be accomplished by distillation as provided in U.S. Pat. No. 5,902,893 which is incorporated by reference.

Examples of other metal sources for the production of other metal oxide particles include metal compounds such as isopropoxides, acetates, acetylacetonate, oxylates, butoxides, methoxides, ethoxides, chloromethoxy, chloroethoxy, methyls, ethyls, and the like. Still other metal sources can include tetraalkyl titanates, e.g., tetra n-butyl titanate and tetra-isopropyl titanate, etc.

The first catalyst may comprise an acid catalyst or a base catalyst. In one embodiment, the first catalyst is an acid type catalyst. Examples of suitable acid catalysts include, but are not limited to, hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof. In one embodiment, the first catalyst comprises a base catalyst chosen from ammonium hydroxide, quaternary ammonium hydroxides, hydroxylamines, derivatives of hydroxylamines, amino pyridines, or combinations of two or more thereof. In one embodiment, the base catalyst has a concentration of about 0.01% to about 10% by weight. In one embodiment, the molar concentration of the base catalyst to the metal alkoxide source is from about 0.1:1 to about 4.0:1; from about 0.5:1 to about 3:1.

The oxygenated material can be chosen from a primary alcohol, a secondary alcohol, or tertiary alcohol comprising one to eight carbon atoms; a hindered alcohol; a cyclic alcohol; a substituted alcohol; a diol; tetrahydrofuran; pyrrolidone; a substituted pyrrolidone; dimethyl sulfoxide; furfural; methyltertiarybutylether; or a combination of two or more thereof. In one embodiment, the primary alcohol is an alcohol having one to ten carbons. Suitable alcohols include, but are not limited to, methanol, ethanol, propanol, butanol, pentanol, hexanol, heptanol, octanol, nonanol, decanol, or combinations of two or more thereof.

In one embodiment, the first surfactant may be a co-surfactant system. The co-surfactant can aid in transporting solution to the micelle containing metal oxide oligomers such as, for example, low molecular weight polymethoxysiloxanes. In one embodiment, the co-surfactant system includes a mixture of hydrocarbons. One of the hydrocarbons may be a cyclic hydrocarbons including cyclopentane, cyclohexane, cyclooctane, and even derivatives thereof such as methyl cyclohexane, p-alkyl cyclohexane, and the like, and linear or branched aliphatic hydrocarbon having carbon numbers from 5 to 12 and alkyl derivatives thereof such as isopentane, isohexane, isooctane, and the like, or a combination of two or more non-polar compounds. The second compound of the co-surfactant system may be an alcohol. Particularly suitable alcohols may be chosen, for example, from tertiary alcohols, cyclic alcohols, or combinations of two or more thereof. Suitable tertiary alcohols include, for example, tertiary butyl alcohol, 2-methyl 2-butanol or tertiary amyl alcohol, or derivatives thereof such as 2-methyl 2-pentanol, 2-methyl 2-hexanol, and the like. Non-limiting examples of suitable cyclic alcohols include cyclopentanol, cyclohexanol, cyclooctanol and alkyl derivatives thereof such as 4-methylcyclohexanol, and the like.

Additional examples of surfactants suitable for the co-surfactant include, for example, alcoholic solvents and ketonic solvents. Examples of suitable alcoholic solvents include, for example, tertiary amyl alcohols, methyl alcohol, ethyl alcohol, n-propanol, i-propanol, n-butanol, i-butanol, sec-butanol, t-butanol, 4-methyl 2-pentanol, cyclohexanol, methylcyclohexanol, and/or glycerol. Examples of suitable ketonic solvents include acetone, methyl ethyl ketone, methyl-n-propyl ketone, methyl-n-butyl ketone, methyl-1-butyl ketone, diethyl ketone, cyclohexanone, methylcyclohexanone or acetylacetone.

In one embodiment, an additional surfactant can be added to the system to control the particle size distribution. Such surfactants can include non-ionic surfactants. In one embodiment, the non-ionic surfactant comprises a polyglycol, block copolymers of ethylene oxide and propylene oxide, and combinations thereof.

It will be appreciated that the first surfactant can be added to the hydrolysate reactor after the addition of the metal source. The first surfactant such as, for example, a co-surfactant can be added in a measured or controlled manner or added after the all the metal source is added to the hydrolysate reactor.

The amount of metal in the prepolymer can be chosen as desired for a particular application or intended use. In one embodiment, the metal is present in the prepolymer in an amount of about 25 percent by weight or greater; about 30 percent by weight or greater; about 45 percent by weight or greater; even about 50 percent by weight or greater. In one embodiment, the metal is present in the prepolymer in an amount of from about 25 percent by weight to about 80 percent by weight; from about 30 percent by weight to about 70 percent by weight; even from about 40 percent by weight to about 60 percent by weight. Here as elsewhere in the specification and claims, numerical values can be combined to form new and non-disclosed ranges.

Grafting a Functional Moiety to the Prepolymer

The process further includes attaching a functional material to the prepolymer. The functional organometal material may be chosen from any material suitable for providing the prepolymer and resulting metal oxide hydrogel particles with a desired functional group. In one embodiment, the functional group can provide the organic-inorganic hybrid material with a functional group to render the material stimuli responsive and able to undergo a change in property upon exposure to a particular medium The functional organometal material can comprise (a) a metal component comprising a leaving group attached to the metal, and (b) an organic functional moiety attached to the metal atom. In one embodiment, the metal atom of the functional organometal material is chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

The leaving group can be any suitable labile leaving group that can react with a species or the polymer backbone, e.g., via a condensation type reaction. In one embodiment, the leaving group is chosen from an alkoxy group, a halogen, an aryloxy group, an acyloxy group, an alkoxy carbonyloxy group, an alkyl thio group, etc., or a combination of two or more thereof. In one embodiment, the leaving group is methoxy, chlorine, fluorine, or a combination of two or more thereof.

While the leaving group and functional moiety are described as being attached to the metal atom, it will be appreciated that the phrase "attached to the metal atom" can refer to the leaving group being directly attached to the metal atom or indirectly attached to the metal atom via a linking group that is directly attached to the metal atom. Examples of suitable linking groups include, but are not limited to, an alkyl or aryl group.

The functional moiety can be chosen or selected for a particular purpose or intended use. The functional group can be chosen to impact a particular property or stimuli responsive property to the hybrid material. Non-limiting examples of suitable functional moieties include, a glycol, an alkylene glycol, an acrylic, an amide, a quaternary ammonium compound, a phosphate, a phosphonate, a sulfonate, an amino, a mercapto, an alkyl, an alkyne, an alkene, an azo, a conjugated alkene, a cyclic compound, an alcohol, etc., or a combination of two or more thereof. The functional moiety can be attached to the metal atom either directly or indirectly via a linking group. Examples of suitable linking groups include, but are not limited to, alkyl, aryl, urethane, urea, etc.

In one embodiment, the functional organometal material employed to functionalize silica particles comprises a urethane or urea derived from (1) an isocyanated alkoxysilane and (2) a material of a desired moiety, which has a terminal or reactive hydroxyl or amine group for reacting with the isocyanate group of the isocyanated alkoxysilane. In one embodiment, the functional organometal material is a material containing a urethane or urea linkage derived from (1) an isocyanated alkoxysilane, and (2) a hydroxyl-terminated or amine-terminated ether. In one embodiment, the hydroxyl-terminated or amine-terminated ether is a polyalkylene glycol alkyl ether or an amine-terminated polyakylene glycol alkyl ether for providing silica particles functionalized with a polyalkylene glycol moiety.

The functional organometal material may be derived from an isocyanated alkoxysilane of the formula:

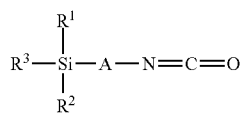

where $R^1$, $R^2$, and $R^3$ are alkoxyl groups of 1 to 10 carbon atoms, and A is a divalent radical selected from straight or branched alkylene of from 1 to 12 carbon atoms, phenylene or phenylene substituted with halogen, or alkyl or alkoxyl of from one to four carbon atoms. $R^1$, $R^2$, and $R^3$ may be the same or different from each other. In one embodiment, $R^1$-$R^3$ are each ethoxy groups, and A is propyl such that the isocyanated alkoxysilane is 3-(triethoxysilane) propyl isocyanate.

In one embodiment, the functional organometal material comprises a polyalkylene glycol moiety, and is derived from a polyalkylene glycol alkyl ether or an amine-terminated polyalkylene glycol alkyl ether. The polyalkylene glycol alkyl ether may be of the formula:

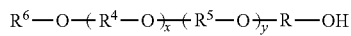

and the amine terminated polyakylene glycol alkyl ether may be of the formula:

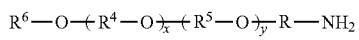

where $R^4$ and $R^5$ are each individually an alkyl of 2 to 10 carbon atoms, linear or branched (as in isopropyl), $R^6$ is an alkyl of 1 to 10 carbon atoms, R is one of $R^4$ or $R^5$, and x and y are such that the molecular weight of polyalkylene glycol or amine-terminated polyalkylene glycol is at least from 100 to 7000 Da. In one embodiment, the polyalkylene glycol alkyl ether or amine-terminated polyalkylene glycol alkyl ether has a molecular weight of about 350 to about 3,000 Da.

Non-limiting examples of suitable polyalkylene glycol alkyl ethers that may be used to form the functional organometal material include, polyethylene glycol monomethyl ether, polyethylene glycol monoethyl ether, polyethylene glycol monoisopropyl ether, polyethylene glycol monobutyl ether, polyethylene glycol monooctyl ether, polyethylene glycol monodecyl ether, polyethylene glycol monohexadecyl ether, polyethylene glycol monooctadecyl ether, polypropylene glycol monomethyl ether, polypropylene glycol monoethyl ether, polypropylene glycol monoisopropyl ether, polypropylene glycol monobutyl ether, polypropylene glycol monooctyl ether, polypropylene glycol monodecyl ether, polypropylene glycol monohexadecyl ether, polypropylene glycol monooctadecyl ether, nonophenyl ethoxylate, etc., or a combination of two or more thereof.

The functional organometal material may be formed by reacting an isocyanated alkoxysilane with a polyalkylene glycol alkyl ether or an amine-terminated polyalkylene glycol alkyl ether. The reaction may be carried out in the presence of a metal catalyst and an appropriate solvent. In one embodiment, the functional organometal material is formed by reacting an isocyanated alkoxysilane and a polyalkylene glycol alkyl ether or an amine-terminated polyalkylene glycol alkyl ether in the presence of a dibutyl tin catalyst and tetrahydrofuran under reflux for two days. After completion of the reaction, the functional organometal material product is stripped of the solvent (e.g., tetrahydrofuran).

Other suitable functional moieties for forming the functional organometal material include, but are not limited to, amides, quaternary ammonium compounds, etc. In one embodiment, the functional moiety comprises an alkyl acrylamide, an alkyl methacrylamide, or a combination of two or more thereof. The alkyl(meth)acrylamide material may include alkyl and carbonyl alkyl (meth)acrylamides having from 2 to 15 carbon atoms in the alkyl moiety, and preferably from 4-12, or 6-10 carbon atoms in the alkyl moiety. Exemplary monomers include those such as tertiary butyl acrylamide, N-tertiary octyl acrylamide, isopropyl acrylamide, N-(1,1,-dimethyl-3-oxobutyl)acrylamide, etc.

In another embodiment, the functional moiety is chosen from a quaternary ammonium compound. Non-limiting examples of suitable quaternary ammonium compounds and phenolic antimicrobial agents include benzalkonium chlorides and/or substituted benzalkonium chlorides, di(C6-C14)alkyl di short chain (C1-4 alkyl and/or hydroxyalkyl) quaternaryammonium salts, N-(3-chloroallyl)hexaminium chlorides, benzethonium chloride, methylbenzethonium chloride, and cetylpyridinium chloride. Other suitable quaternary compounds include alkyl dimethylbenzylammonium chlorides, dialkylmethylbenzylammonium chlorides, and mixtures of two or more thereof. An example of a suitable quaternary amine containing silane is octadecyldimethyl(3-trimethoxysilyl propyl)ammonium chloride from Gelest, Inc.

Additionally, the functional moiety may be chosen to provide the particles that exhibit changes in electrical or optical characteristics in response to stimuli. Non-limiting examples of suitable materials include thioethers, thiophenes, polyanilines, chromophores, etc.

Without being bound to any particular theory, the functional organometal material may have, in one embodiment, the formula:

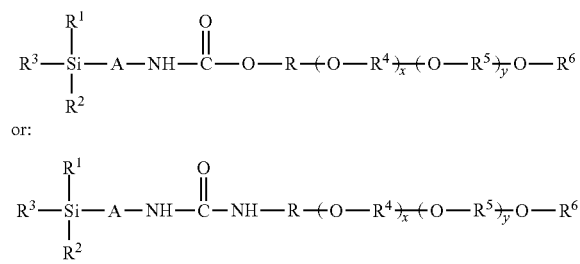

or:

depending on whether the precursor is derived from a hydroxyl or amine terminated material, where $R^1$-$R^6$, R, x, and y may be any component or value as described above. It will be appreciated that the Si atom can be replaced by any suitable metal atom. In one embodiment, the functional organometal material is a urea polyalkylene formed as shown below:

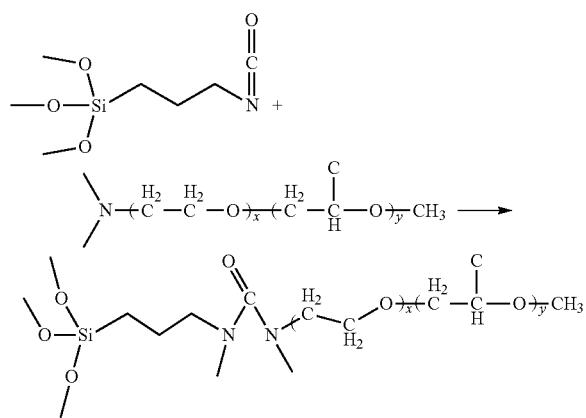

In another embodiment, the functional organometal material is a material formed as follows:

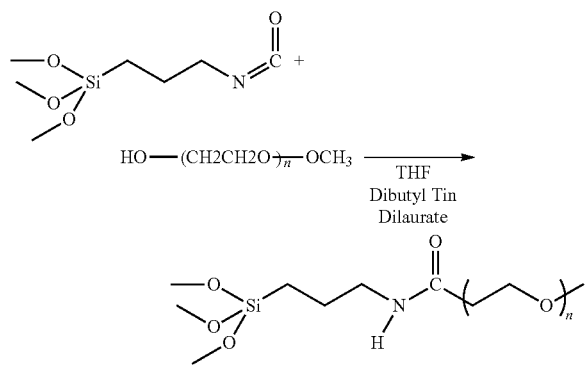

Other functional organometal materials may also be employed to provide functionalized metal oxide hydrogel particles. In one embodiment, the functional organometal material may be a silane that comprises a functional group such as a polyethylene glycol. Non-limiting examples of such materials include those available from Momentive Performance Materials including A-1230®.

The process of grafting the functional organometal material can comprise adding the functional organometal material to a reactor comprising the prepolymer material. Water can also be added to the prepolymer material with the addition of the functional organometal material. In one embodiment, the functional organometal material is added to the reactor comprising the prepolymer material after the prepolymer material has equilibrated to about 35° C. (and in one embodiment not any lower than that). In one embodiment, temperature of the reaction during the grafting process can be from about 15° C. to about 50° C.; even from about 25° C. to about 40° C.

The addition of the functional organometal material to the prepolymer can be carried out in a substantially continuous manner or by intermittent additions. In one embodiment, the addition of the functional organometal material can be made by controlled, scheduled additions over a period of time (allowing the reactor contents to cool or equilibrate between successive additions of the functional organometal material.). In one embodiment, the functional organometal material is added intermittently at intervals of from about 5 minutes to about 40 minutes; at intervals of from about 10 minutes to about 30 minute; even intervals of from about 15 minutes to about 25 minutes. After the addition of the functional organometal material is complete, water may be added to the reaction mixture and the mixture is equilibrated. In one embodiment, the reaction mixture is allowed to equilibrate to about 29° C. If the mixture is already below 29° C., a co-surfactant may be added. In one embodiment, the co-surfactant is a mixture of tertiary amyl alcohol and cyclohexane. It will be appreciated that other co-surfactants may be used.

In one embodiment, the grafting or branching to a polymer backbone, etc., polyalkoxysiloxane can be effected at a such a rate that it does not self-condense. Therefore in one embodiment, the rate of addition of the organometallic material to the polyalkoxysiloxane or any polymetalloxanes is at a rate that at least one of the leaving groups attached to the reactive polymer backbone leaves at rate that is faster than self-condensation of the organometalloxane.

A particularly suitable branching method is to limit the amount of nucleophiles and instead allow for a certain time and temperature for the leaving group to attach to the backbone by elimination or condensation as in an alcohol-like methanol for a methoxy leaving group. The time and temperature is a function of the material that will have to be grafted. For a 10% by weight loading of the organosilane for example, a suitable method is to add the organosilane at 15 minute interval after the cool down from an adiabatic reaction of the reactive polymer backbone. The temperature of addition for materials like tetramethoxysilane and tetraethoxysilane with any silanes containing a PEG substituent is from 25 to 40° C. The amount of nucleophiles to effect branching is from 0 to 2 moles per mole of the alkoxysilane backbone. In one embodiment, the method includes a post-branching addition of the nucleophile to allow complete reaction and to produce a slight exotherm. The amount of nucleophilic substituent is enough to raise slightly the reaction temperature by at least 1° C.

The organo-organometalloxane as derived from grafting the functional moiety to the polymer can be allowed to undergo vaporization of 2% to 100% volatiles. The vaporization temperature is conducted at a controlled rate so that heavier materials such as heavy alcohols (boiling point greater than 100° C.) and other mediating oxygenated material are not substantially removed. On cooling after vaporization, a water-dispersant promoter such as cyclic aliphatics, aromatics and substituted aromatics, is added proportionately to the total amount of polyorgano-organometalloxane (also called multi-precursor). For siloxanes, a co-dispersant can be used (such as cyclohexane) in the amount no larger than 30% of the organo-polymethoxysiloxane mixture. To promote a tighter particle size distribution as well as shape and size, a surfactant or mixture of surfactants can be added to either the functional moiety precursor or water or both. Suitable surfactants for siloxanes include, but are not limited to, nonionics such as polyethylene glycol, polypropylene glycol, block copolymers of ethylene and propylene polyglycols, cyclic, phenolic, substituted aromatics and substituted phenolics in a polyethylenepolypropylene glycol, alkyl polyethers and polyols.

FIG. 1 illustrates a reaction scheme for forming a forming a metal oxide prepolymer functionalized with a PEG moiety. As shown in FIG. 1, the process includes forming a siloxane prepolymer from TMOS. The siloxane prepolymer is reacted with a functional organometal material, a urethane of polyethylene glycol methyl ether propyl trimethoxy silane, to form the precursor material.

Figure 2:
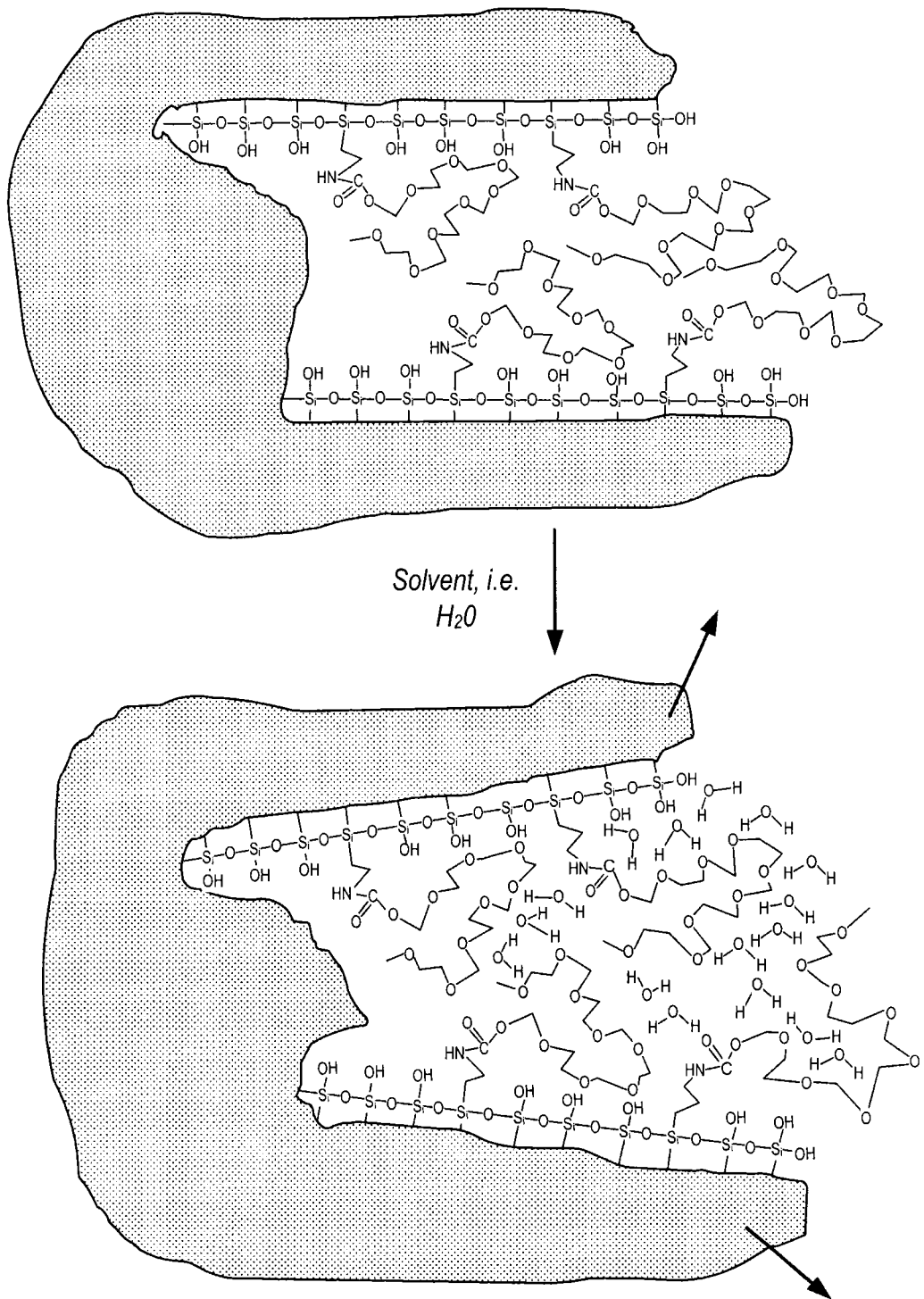
FIG. 2 is a schematic representation of swelling of materials in accordance with aspects of the invention in response to an external stimuli.

The materials produced by the present process are organic-inorganic hybrid materials. In one embodiment, the materials produced by the process are organometal oxide hydrogel particles. The hydrogel particles may be responsive to changes in surrounding conditions (e.g., when soaked or exposed to a particular liquid) such that they exhibit observable, measurable properties such as swelling. FIG. 2 is a schematic illustrating a material comprising a PEG pendant group on the siloxane backbone. The PEG group provides a material that will swell in a variety of solvents including, for example, water, low carbon alcohols, and other molecules that are hydrophilic and hydrophobic. FIG. 2 illustrates the concept of material swelling.

Formation of Metal Oxide Hydrogel Particles

In one example, metal oxide hydrogel particles can be formed by adding the organic-inorganic hybrid material to a particle reactor comprising water and a base catalyst. In one embodiment, the particles are formed within an oil-in-water emulsion. Without being bound to any particular theory, the addition of the organic-inorganic hybrid material to a mostly water solution provides an oil-in-water emulsion.

Suitable base catalyst materials include, for example, non-alkaline metal bases such, organic bases, non-metal bases that promote nucleophilic substitution or combinations of two or more thereof. Examples of suitable non-alkaline metal bases include ammonium hydroxide, as well as aqueous solution of ammonium carbonate or ammonium bicarbonate. Examples of suitable organic bases include quaternary alkyl ammonium hydroxides such as tetramethylammonium hydroxide. Examples of suitable non-metal bases that promote nucleophilic substitution include hydroxylamines and organic hydroxylamines such as N,N-dimethylhydroxylamine, N,N-diethylhydroxylamine, and 4-dimethylaminopyridine. The pH of the solution in the particle reactor may be adjusted to a pH of about 10.

The process of forming particles can further comprise adding a surfactant to the system. The surfactant can be an ionic or non-ionic surfactant. In one embodiment, the surfactant is added to or part of the water solution in the reactor comprising the water and the base catalyst. In another embodiment, the surfactant is added to the organic-inorganic hybrid material prior to adding the hybrid material to the system comprising the water and the base catalyst. In one embodiment, the surfactant comprises a polyglycol, an alkylene oxide, a cyclic hydrocarbon, a linear or branched aliphatic hydrocarbon having carbon numbers from 5 to 12 and alkyl derivatives thereof, or combinations of two or more thereof.

The process of forming particles can also adding a highly polar material to organic-inorganic hybrid material, the water of the solution comprising water and the base catalyst, or both. The highly polar material can be chosen from a cycloaliphatics, a linear and/or branched aliphatic from 3-12 carbons atoms, an aromatic, an alkylated aromatic, a cyclic alkenes, a cyclic alkane, or a combination of two or more thereof.

Particles can be formed from continuous addition of the multi-precursor to water at temperatures and agitator RPM at the desired particle size and range at suitable pH. The pH can be in the range of about 2 to about 12; about 4 to about 10; even about 6 to about 8. In one embodiment, the pH is at least about 7. In one embodiment, the pH is at least 3 and the temperature is at least 2° C. In still another embodiment, the pH is at least about 7, and the temperature is at least about 5° C. Smaller particles ranging from 5 to 25 microns are preferably formed at least 5° C. and pH of at least 8. Larger particles ranging from 25 to 120 microns are preferably formed with at pH of at least 8 and temperature of at least 10° C.

The particles can contain about 5 percent by weight or greater of organic material; about 10 percent by weight or greater of organic material; even about 15 percent by weight or greater of organic material.

The use of cross-linkers and high molecular weight hydrogels are preferred for actives delivery. In one embodiment, the crosslinker is chosen from an acrylic, a urethane, an isocyanate, a vinyl, an epoxy, an oxirane, or a combination of two or more thereof. The high molecular weights hydrogels include long chain glycols and polyols that are temperature sensitive that tend to either coil or unwind. These also include, but are not limited to, poly(N-isoproplyacrylamide)-block-poly(ethylene glycol)-block-poly(N-isoproplyacrylamide)triblock copolymers).

Certain hydrogels that contain acrylics can employ carbodiimides as crosslinkers to control the swelling of the hydrogel particles. Other systems can use specific crosslinking agents as well to control mechanical properties or responses of the material to external stimuli.

Crosslinking will occur when the carbodiimide is added to the solution after particle formation. Alternatively, crosslinking of the particles with other chemistries can occur when the particles are exposed to an external stimuli of interest to effect a property change in the organic-inorganic hybrid material.

The hydrogel particles can be substantially spherical particles. The particles can have an average particle size of from about 1 micron to about 130 microns; from about 5 microns to about 80 microns; even from about 10 microns to about 70 microns. Here as elsewhere in the specification and claims, numerical values can be combined to form new and non-disclosed ranges. Particle size can be measured using a Horiba model LA950 after dispersing the particles in deionized water.

In one embodiment, the particles have a mean particle size distribution of from about 5 microns to about 80 microns;

from about 10 microns to about 75 microns; from about 20 microns to about 60 microns; even from about 30 microns to about 50 microns. Here as elsewhere in the specification and claims, numerical values can be combined to form new and non-disclosed ranges.

In one embodiment, the hydrogel particles have a surface area of from about 5 square meters per gram to about 1000 square meters per gram; from about 150 square meters per gram to about 700 square meters per gram; even from about 300 square meters per gram to about 600 square meters per gram. Here as elsewhere in the specification and claims, numerical values can be combined to form new and non-disclosed ranges.

Figure 3:
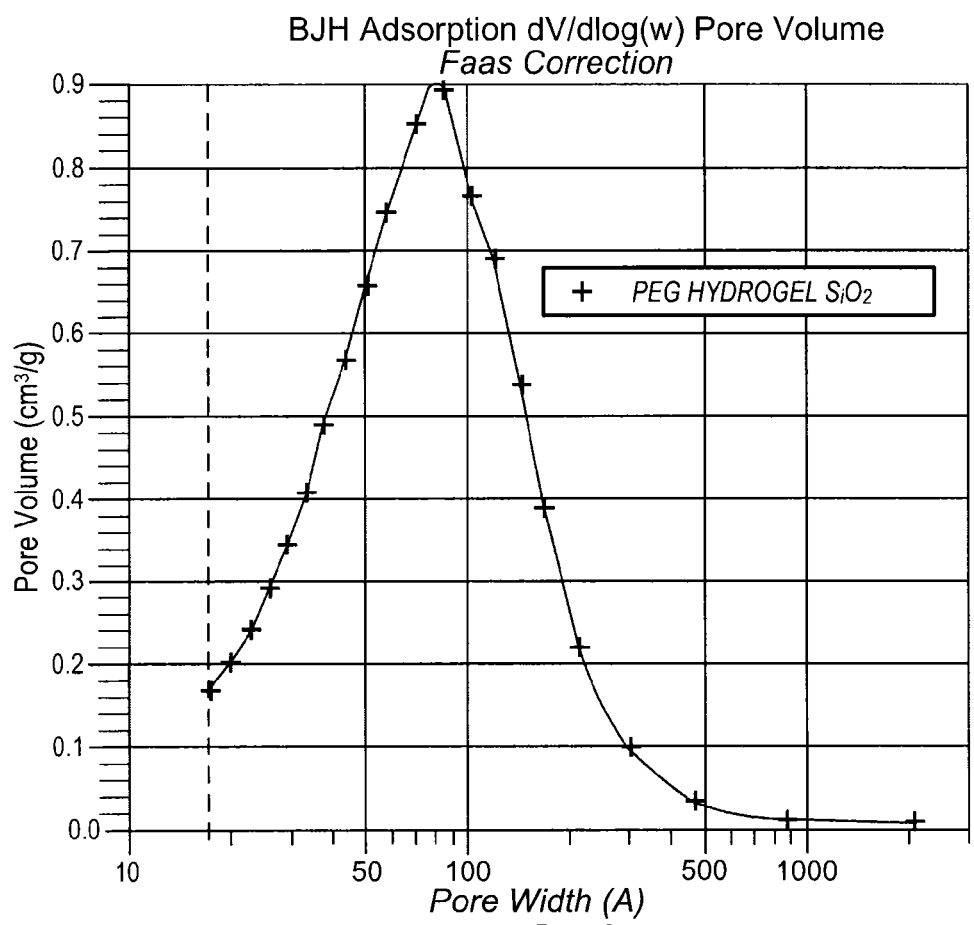
FIG. 3 is a graph showing pore size distribution of a hydrogel-silica particle in accordance with aspects of the invention.

The functionalized particles, formed by any of the processes described herein, can have an average pore size of from about 20 angstroms to about 2000 angstroms; from about 50 angstroms to about 1500 angstroms; from about 100 angstroms to about 1000 angstroms; even from about 250 angstroms to about 750 angstroms. Pore size distribution can be measured by any suitable method including by nitrogen adsorption. FIG. 3 shows a graph of pore size distribution of a hydrogel silica particle formed in accordance with aspects and embodiments of the invention.

Figure 4:
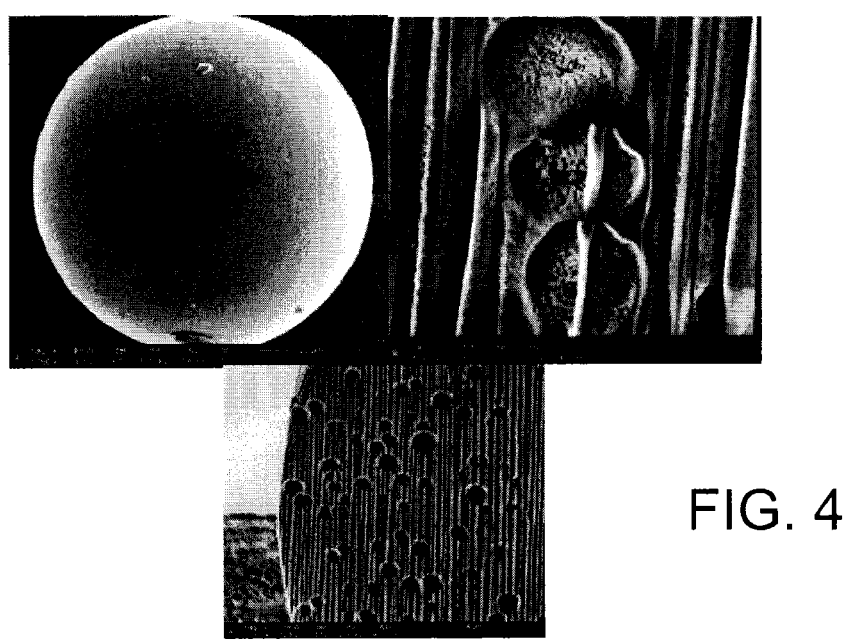
FIG. 4 are SEM micrographs of functionalized particles showing the spherical particle and cross-sections thereof in accordance with aspects of the invention.
Figure 6:
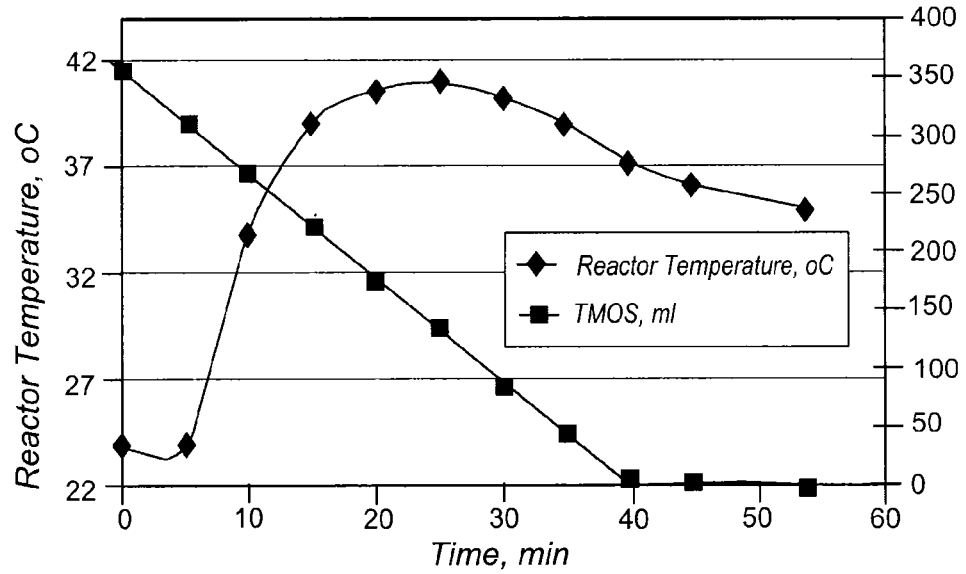
FIG. 6 is a graph showing the reactor kinetics for the formation of a prepolymer material.

Additionally, the particles can comprise macropores that are about 0.25 micron or greater; even 0.5 micron or greater. FIG. 4 includes SEM images of functionalized particles formed in accordance with aspects and embodiments of the invention. FIG. 6 illustrates a functionalized particle that is substantially spherical in shape. FIG. 6 also shows cross sections of the particle and the macroporosity that can exist in the particles. It is noted that the vertical lines in the cross sections of FIG. 6 are artifacts of the cross sectioning process.

It will be appreciated that the organic-inorganic hybrid material can be treated to remove or strip away any reaction products, e.g., residual materials derived from leaving groups such as alcohols, etc., that are part of the reaction between the prepolymer and the functional organometal material in order to activate or accelerate further reactions. For example, as shown in FIG. 1, the reaction of the prepolymer and the functional organometal material produces alcohols such as methanol. These materials may be removed by any suitable method including stripping the material by evaporating the leaving group from the solution.

Aspects of the invention may be further understood with reference to the following examples. The examples are intended to illustrate aspects or embodiments of the invention and are not intended to limit the invention.

EXAMPLES

Preparation of Urethane of Polyethylene Glycol-Methyl Ether Gamma Propyl Trimethoxysilane A urethane of polyethylene glycol methyl ether gamma propyl trimethoxysilane is made according to the following formula:

| | |
|---|---|
| PEGME (grams) | 350.00 |
| THF (ml) | 1796.18 |
| A Link-35 (grams) | 272.10 |
| Dibutyl tin dilaurate (ml) | 66.95 |

Figure 5:
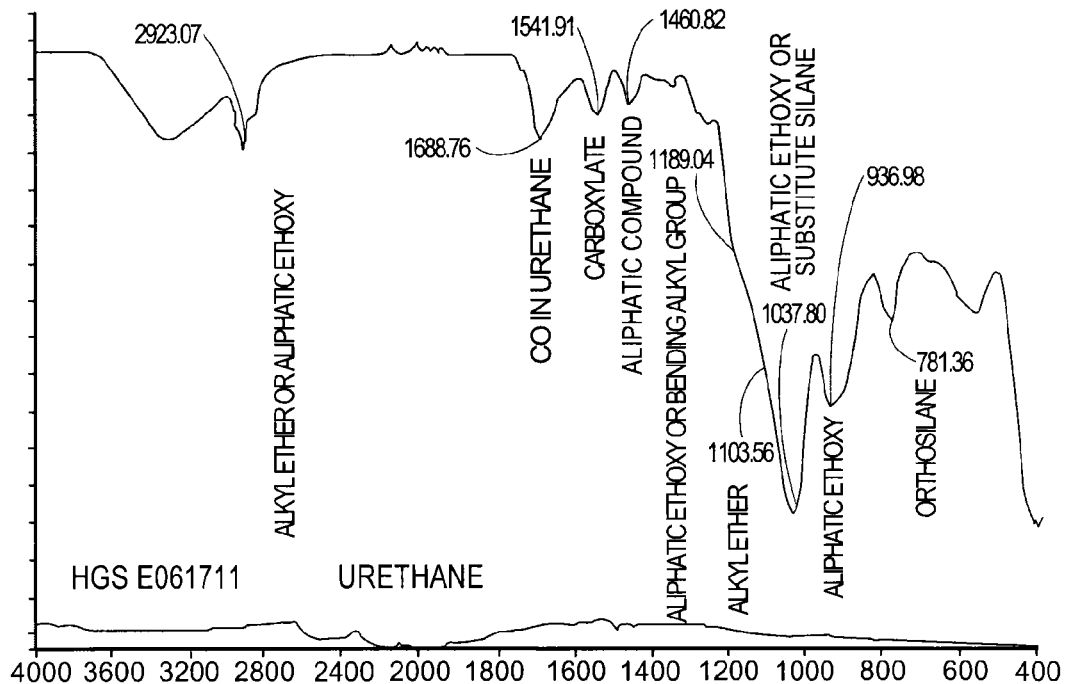
FIG. 5 is an FTIR spectrum of a functional moiety employed in accordance with aspects of the present invention for providing functionalized organ metal oxides.

PEGME is methyl ether of polyethylene glycol with MW=350 and A Link 35® is Momentive product, viz., gamma isocyannatopropyl trimethoxysilane and THF is tetrahydrofuran. The reaction is conducted at 72 to 80° C. under total reflux for at least 24 hours. Once the reaction is completed, THF is stripped off to near dryness. The FTIR for this material is shown in FIG. 5.

Preparation of Prepolymer for Production of Spherical Hydrogel Silica

In a first reactor is charged 118.27 grams of butanol, 45.11 grams of water, and 2.06 ml of HCl (37%). Tetramethylorthosilicate (TMOS) is then fed to the first reactor at a rate of 10.3 gm/min. The TMOS feed pump is stopped when 385 gms of TMOS is charged to the first reactor. This will give a water to TMOS molar ratio of 0.99. The agitator is set at 150 rpm and the reactor is allowed to exotherm in an adiabatic way as shown in FIG. 6.

The gamma propyl urethane of polyethylene glycol trimethoxysilane, is added only to the first reactor, once it has equilibrated to 35° C. and not lower than that. The schedule of addition is controlled according to the following:

| Urethane of polyethylene glycol methyl ether gamma propyl trimethoxysilane | |
|---|---|
| Rate, gm/min | 8 |
| Equilibration Time Cycle 1 | 15 |
| Addition time, sec | 127 |
| Equilibration Time Cycle 2 | 15 |
| Addition time, sec | 127 |
| Equilibration Time Cycle 3 | 15 |
| Addition time, sec | 127 |
| Equilibration Time Cycle 4 | 15 |
| Addition time, sec | 127 |
| Equilibration Time Cycle 5 | 15 |
| Addition time, sec | 127 |
| Equilibration Time Cycle 6 | 15 |
| Addition time, sec | 127 |
| Equilibration Time Cycle 7 | 15 |
| Addition time, sec | 127 |
| Equilibration Time Cycle 8 | 15 |
| Addition time, sec | 127 |
| Equilibration Time | 15 |

After the second precursor addition is complete, 3.35 gms of water is added and allow the reaction mixture to equilibrate to 29° C. If it is already below 29° C., the following co-surfactants are added and the mixture is allowed to equilibrate for 5 minutes:

| | |
|---|---|
| Tertiary amyl alcohol, gms | 194.53 |
| Cyclohexane, gms | 111.20 |

Methanol Stripping

Switch the first reactor from adiabatic to non-adiabatic. Adjust the reactor temperature so that it is at least 65° C. for methanol to boil off. To increase the evaporation rate, the agitation can be increased to 250 RPM. Continue the methanol stripping until the amount of distillate collected is about 400 ml or so. Cool the first reactor to 30° C.

Hydrogel Particle Generation

Line up the precursor reactor pump to a second reactor (also called the particle reactor) that has been pre-charged with the 1200 gms of water that is adjusted to pH of 10. The agitator is set at 120 RPM and the reactor temperature is set at 18° C. The 2 precursor is fed to the particle reactor at 4 ml/min and at the same time co-feed with a base at 4.1 ml/min to keep the pH of the particle reactor as close as possible to 10.0. The base is composed of aqueous 0.5% NH$_4$OH.

Figure 7:
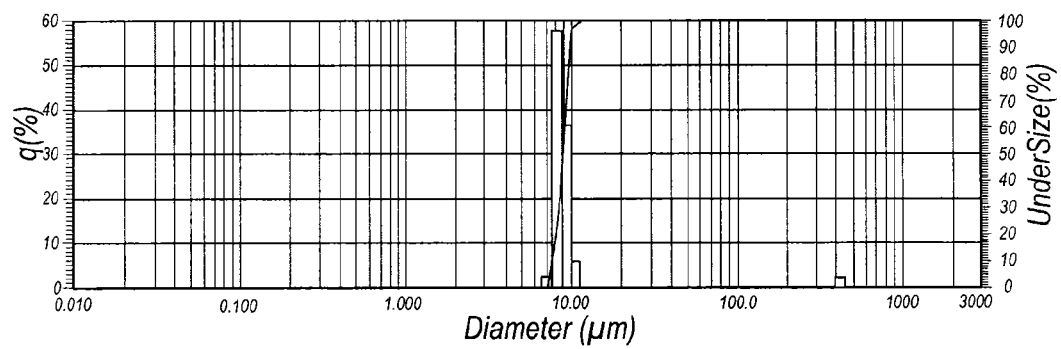
FIGS. 7-8 are graphs showing particle size distribution of a hydrogel particles at different stages of a reaction in accordance with an embodiment of the invention.
Figure 8:
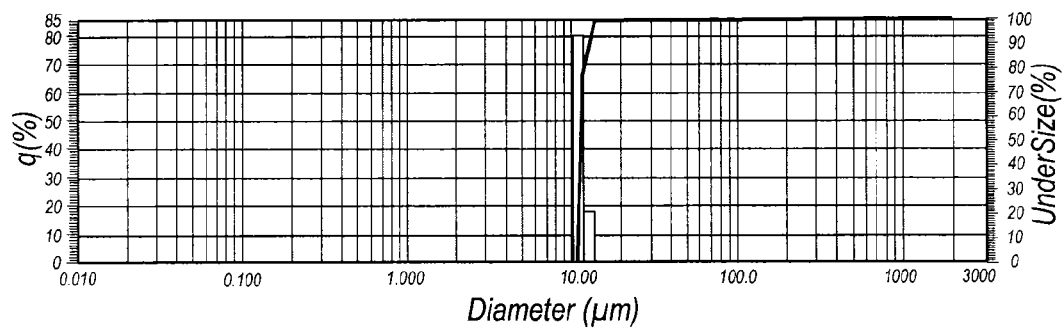

Particle formation can also be performed in segments of several minutes with a parse for the addition of a base to maintain the pH at the desired level to control the particle size. FIGS. 7 and 8 show the particle size distribution after initial particle formation and again 150 minutes later at the end of the synthesis. The hydrogel particle generation shows excellent stability with almost no particle agglomeration.

Figure 9:
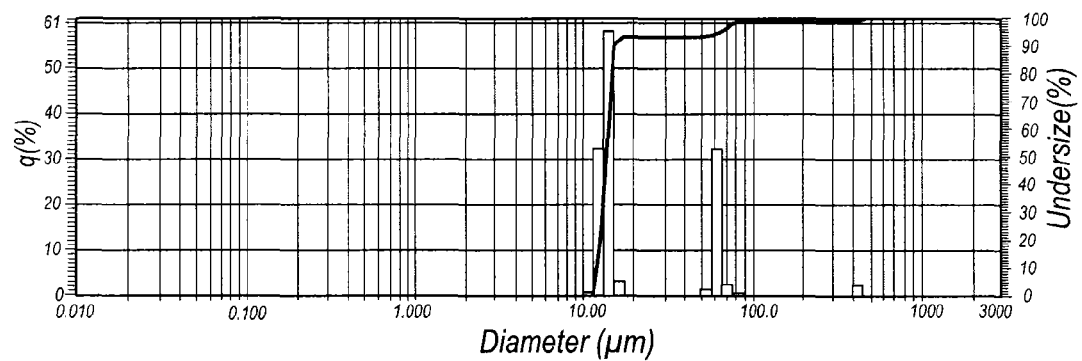
FIG. 9 is a graph showing the effect of temperature on particle size.

Temperature can also affect particle size. FIG. 9 shows the particle size distribution for the temperature-pH profile below.

TABLE 2

| Time (min) | Temp C. ° | pH |
|---|---|---|
| 0 | 19.5 | 9.97 |
| 16 | 19.0 | 9.92 |
| 21 | 19.0 | 9.73 |
| 36 | 18.7 | 9.81 |
| 44 | 18.4 | 9.73 |
| 52 | | |
| 58 | 18.3 | 9.74 |
| 70 | 18.8 | 9.69 |
| 82 | 18.7 | 9.69 |
| 88 | 18.6 | 9.65 |
| 93 | 18.6 | 9.63 |
| 110 | 18.2 | 9.62 |

Figure 10:
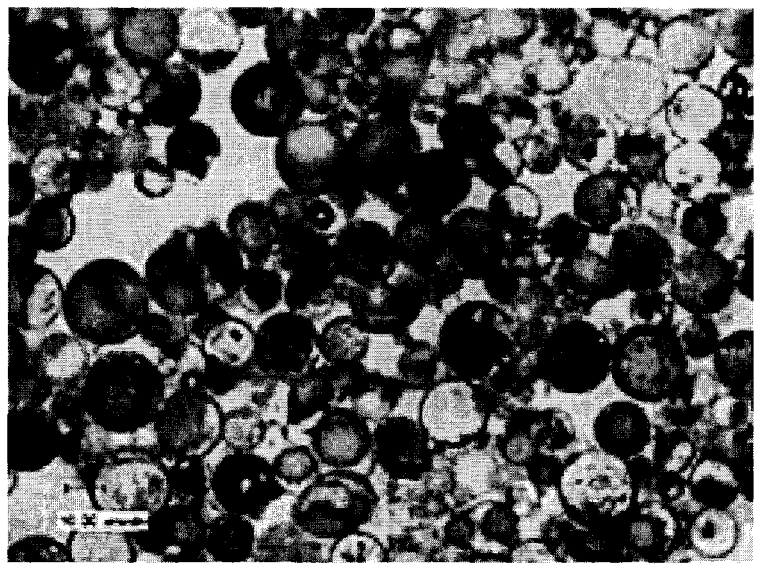
FIG. 10 is an optical microscope image of silica hydrogel particles formed in accordance with an embodiment of the invention.
Figure 11:
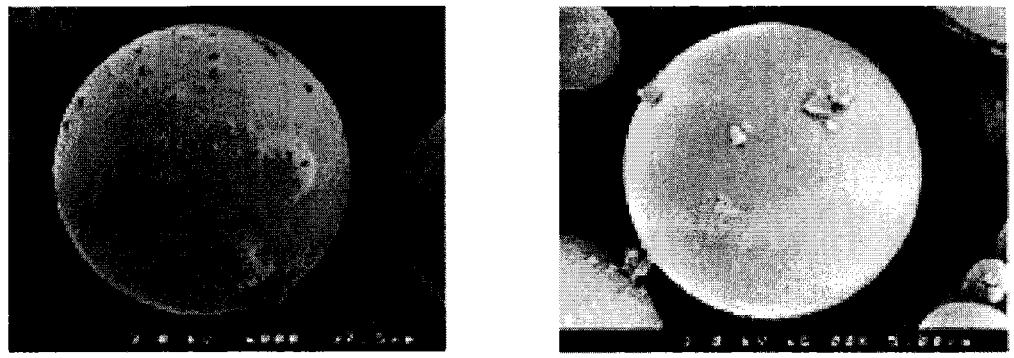
FIG. 11 is a SEM image of the particles formed in accordance with aspects of the invention.
Figure 12:
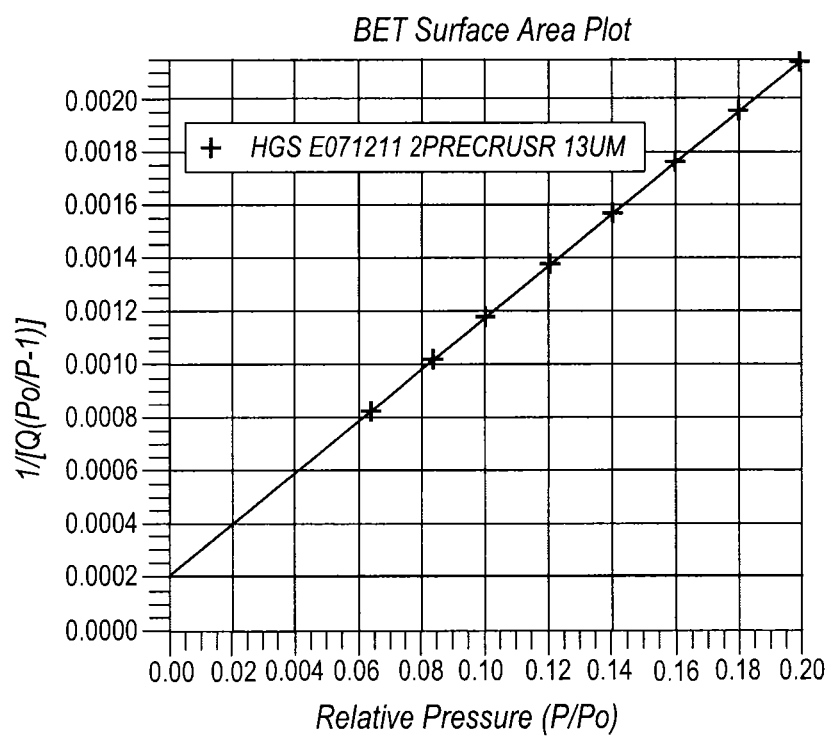
FIG. 12 is a graph showing the goodness of fit for a surface area measurement of hydrogel particles.
Figure 13:
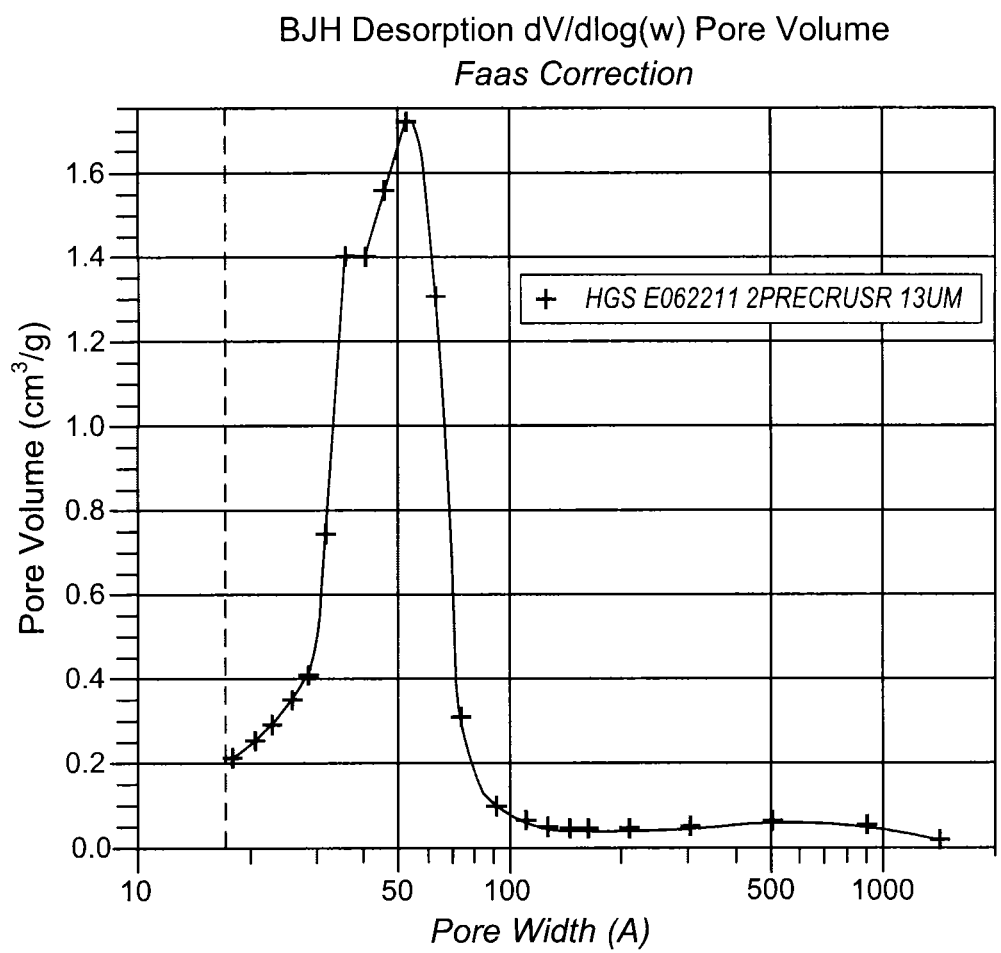
FIG. 13 is a graph showing the pore site distribution of particles formed in accordance with aspects of the invention.

FIG. 10 shows an optical microscope image and FIG. 11 is a SEM image of the particles made in accordance with aspects and embodiments of the disclosed methods. FIG. 12 illustrates the surface area of the particles. FIG. 13 illustrates the pore size distribution of the particles.

Figure 14:
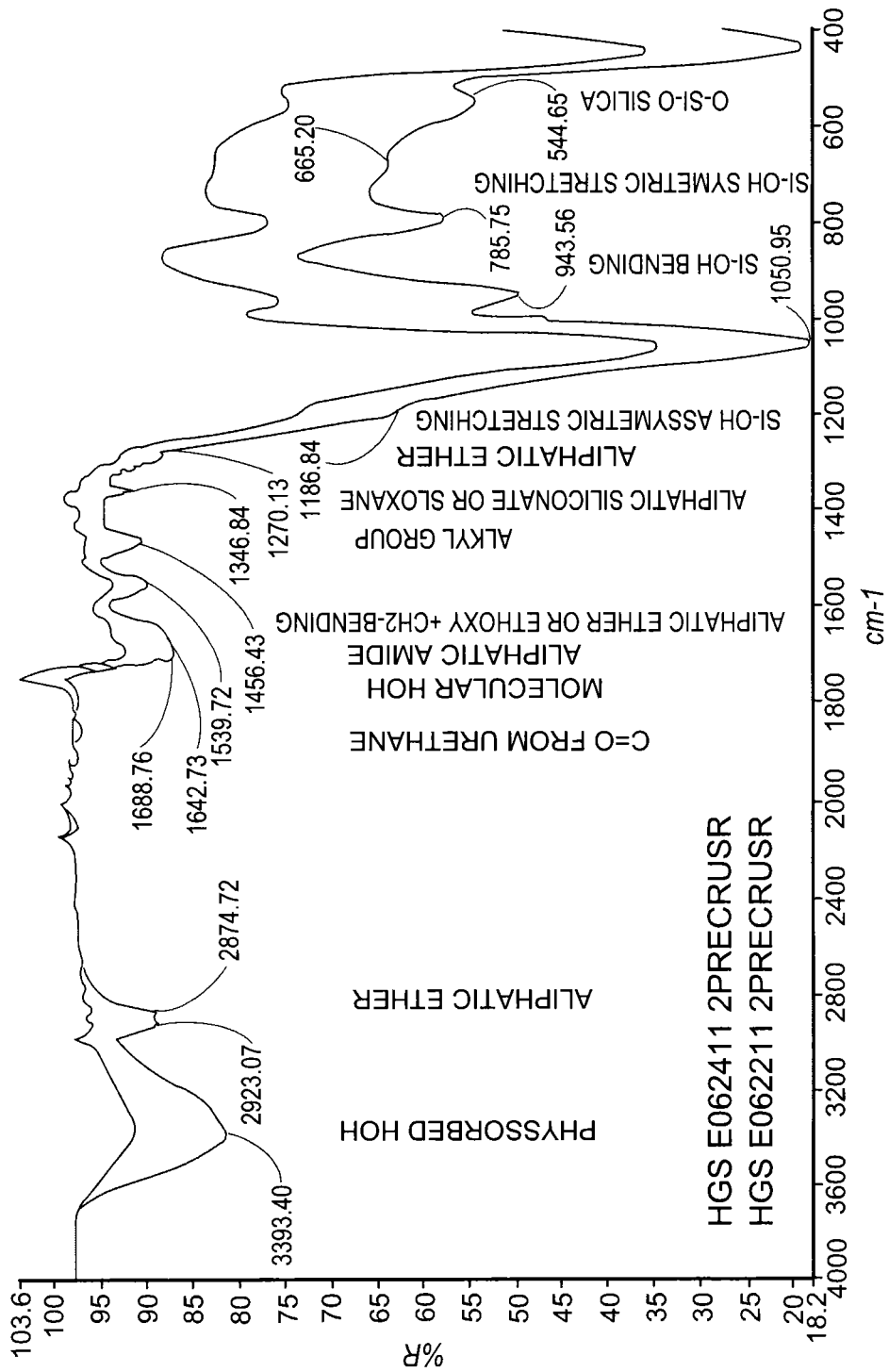
FIG. 14 is a FTIR spectra of the functionalized particles formed in accordance with aspects of the invention.

FIG. 14 is a FTIR spectrum that illustrates the particles that have been functionalized with a urethane moiety.

The stimuli responsiveness of the particles is also evaluated by evaluating the swelling of the particles in different media. Swelling is evaluated by changes in settled bed height in various solvents. The results are shown in the table below.

TABLE 3

| | 63 < x < 106 Particles Organics Swelling Vial | | | |
|---|---|---|---|---|
| | A | B | C | D |
| Liquid Solution | Butanol/Xylene | Butanol/Xylene | Butanol | Xylene |
| Percentage | 50/50 | 50/50 | 100 | 100 |
| Weight Empty (g) | 20.966 | 20.765 | 20.9571 | 20.9453 |
| Weight w/Particles (g) | 24.2955 | 23.8091 | 24.0488 | 23.9427 |
| Particles (g) | 3.3295 | 3.0441 | 3.0917 | 2.9974 |
| Weight add Solution (g) | 34.5829 | 33.7492 | 33.9945 | 34.1431 |
| Solution (g) | 10.2874 | 9.9401 | 9.9457 | 10.2004 |
| Height Dry Particles (mm) | 29 | 27.5 | 28.5 | 26 |
| Height Wet Particles (mm) | 33 | 31.5 | 33 | 28.5 |
| Height Wet Tapped Particles (mm) | 29 | Dry | 21.5 | 25.5 |
| Swelling Index (Δh/h) | 0.138 | 0.145 | 0.158 | 0.096 |
| Swelling Percent | 13.8 | 14.5 | 15.8 | 9.6 |

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

What is claimed is:

1. A process for forming an organic-inorganic hybrid particle that can undergo a property change when exposed to an external stimulus, the process comprising:
   forming an organic-inorganic material, the process of forming the material comprising:
      providing a prepolymer oligomer; and
      attaching a functional organometal material to the prepolymer oligomer, where the functional organometal material comprises (a) a metal component comprising a metal atom comprising a leaving group attached to the metal, and (b) an organic functional moiety attached to the metal atom, where the organic functional moiety is derived from a polyalkylene glycol alkyl ether, an amine-terminated polyalkylene glycol alkyl ether, an alkyl acrylamide, an alkyl methacrylamide, a benzalkonium chloride, a substituted benzalkonium chloride, a di(C6-C14)alkyl di short chain (C1-4 alkyl and/or hydroxyalkyl) quaternaryammonium salt, benzethonium chloride, methylbenzethonium chloride, cetylpyridinium chloride, polymers thereof, or a combination of two or more thereof, and where the hybrid particle comprises a functional moiety and is responsive to an external stimulus, and
   forming an organic-inorganic hybrid particle by reacting the organic-inorganic material in a solution comprising water and a base catalyst.

2. The process of claim 1, wherein the prepolymer oligomer is a metalloxane.

3. The process of claim 1, wherein the prepolymer oligomer comprises a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

4. The process of claim 1, wherein the prepolymer oligomer comprises the metal in an amount of about 25 percent by weight or greater.

5. The process of claim 1, wherein the prepolymer oligomer comprises a siloxane.

6. The process of claim 5, wherein the siloxane comprises a polyalkoxysiloxane.

7. The process of claim 6, the siloxane is derived from tetramethylorthosilicate (TMOS), tetraethylorthosilicate (TEOS), tetrapropylorthosilicate (TPOS), tetramethoxy silane, tetrabutoxy silane, methyl trimethoxy silane (MTMS), methyl triethoxy silane (MTES), phenyl trimethoxy silane, isobutyl trimethoxy silane, tetraalkoxysilanes, siloxane oligomers derived from alkoxysilanes, and pre-polymerized alkoxysilanes, or a combination of two or more thereof.

8. The process of claim 1, wherein the organometal material comprises a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

9. The process of claim 1, wherein the leaving group comprises an alkoxy group, a halogen, or a combination thereof.

10. The process of claim 1, wherein organic functional moiety is derived from a polyalkylene glycol alkyl ether chosen from polyethylene glycol monomethyl ether, polyethylene glycol monoethyl ether, polyethylene glycol monoisopropyl ether, polyethylene glycol monobutyl ether, polyethylene glycol monooctyl ether, polyethylene glycol monodecyl ether, polyethylene glycol monohexadecyl ether, polyethylene glycol monooctadecyl ether, polypropylene glycol monomethyl ether, polypropylene glycol monoethyl ether, polypropylene glycol monoisopropyl ether, polypropylene glycol monobutyl ether, polypropylene glycol monooctyl ether, polypropylene glycol monodecyl ether, polypropylene glycol monohexadecyl ether, polypropylene glycol monooctadecyl ether, nonophenyl ethoxylate, or a combination of two or more thereof.

11. The process of claim 1, wherein providing the prepolymer oligomer comprises forming the prepolymer oligomer by:
adding a metal source to a reaction system comprising water, a first catalyst, and an oxygenated material, and reacting the mixture.

12. The process of claim 11, wherein:
the first catalyst is chosen from hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof; and
the oxygenated material is chosen from a primary alcohol, a secondary alcohol, or tertiary alcohol comprising one to eight carbon atoms; a hindered alcohol; a cyclic alcohol; methyltertiarybutylether, a substituted alcohol; a diol; tetrahydrofuran; pyrrolidone; a substituted pyrrolidone; dimethyl sulfoxide; furfural; or a combination of two or more thereof.

13. The process of claim 1, wherein attaching the functional organometal material to the prepolymer oligomer comprises adding the functional organometal material and water to a solution comprising the prepolymer oligomer.

14. The process of claim 13 wherein adding the functional organometal material to the prepolymer oligomer can be carried out by continuous addition or intermittent addition.

15. The process of claim 1, wherein a non-ionic or ionic surfactant is added to the organic-inorganic material, the water of the solution comprising water and the base catalyst, or both.

16. The process of claim 15, wherein the surfactant comprises a polyglycol, an alkylene oxide, a cyclic hydrocarbon, a linear or branched aliphatic hydrocarbon having carbon numbers from 5 to 12 and alkyl derivatives thereof, or combinations of two or more thereof or a combination thereof.

17. The process of claim 15, comprising adding a highly polar material to the organic-inorganic material, the water of the solution comprising water and the base catalyst, or both.

18. The process of claim 1, wherein the base catalyst comprises a non-alkaline metal base material, an organic base material, a non-metal base material, or a combination of two or more thereof.

19. The process of claim 1 further comprising subjecting the organic-inorganic material to temperature and pressure conditions to remove volatile components from the material prior to particle formation.

20. A process for forming an organic-inorganic hybrid particle that exhibits a property change in response to an external stimulus, the process comprising:
(i) forming an organic-inorganic hybrid material, the process of forming the material comprising:
(a) forming a metaloxo polymer by adding a metal source to a solution comprising a water, an oxygenated material, and a first catalyst and reacting the components in the solution, the metaloxo polymer comprising a reactive site on the polymer chain; and
(b) grafting a functional moiety to the polymer by reacting a functional organometal material with the polymer via the reactive sites on the polymer chain, wherein the functional moiety comprises an organometal material comprising (a) a metal component comprising a metal atom comprising a labile leaving group attached to the metal, and (b) an organic functional moiety derived from a polyalkylene glycol alkyl ether, an amine-terminated polyalkylene glycol alkyl ether, an alkyl acrylamide, an alkyl methacrylamide, benzalkonium chlorides and/or substituted benzalkonium chlorides, di(C6-C14) alkyl di short chain (C1-4 alkyl and/or hydroxyalkyl) quaternaryammonium salts, N-(3-chloroallyl) hexaminium chlorides, benzethonium chloride, methylbenzethonium chloride, and cetylpyridinium chloride, or a combination of two or more thereof and attached to the metal of the metal component, and
(ii) reacting the organic-inorganic hybrid material in a solution comprising water and a base catalyst to form hydrogel particles.

21. The method of claim 20, wherein the metal source comprises a metal alkoxide, a hydrolyzable organometallic compound, oxo metal oligomers, or mixtures of two or more thereof.

22. The method of claim 21, wherein the metal source and organometal material individually comprise a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

23. The method of claim 20, wherein the metal source comprises a metal alkoxide, and the molar ratio of water to metal alkoxide source in a first phase is from about 0.1 to about 4.0.

24. The process of claim 20, the metal source comprises a siloxane derived from tetramethylorthosilicate (TMOS), tetraethylorthosilicate (TEOS), tetrapropylorthosilicate (TPOS), tetramethoxy silane, tetrabutoxy silane, methyl trimethoxy silane (MTMS), methyl triethoxy silane (MTES), phenyl trimethoxy silane, isobutyl trimethoxy silane, a higher tetraalkoxysilane, a siloxane oligomer derived from an alkoxysilane, or a combination of two or more thereof.

25. The process of claim 20, wherein the solution in (a) further comprises a non-polar material chosen from a linear or branched aliphatic hydrocarbon, a cyclic hydrocarbon, an aromatic hydrocarbon, a substituted aromatic hydrocarbon, or a combination of two or more thereof.

26. The process of claim 25, wherein the non-polar material comprises cyclopentane, cyclohexane, cyclooctane, a linear or branched aliphatic hydrocarbon having 5 to 12 carbon atoms and alkyl derivatives thereof, or a combination of two or more thereof.

27. The process of claim 20, wherein the labile leaving group comprises an alkoxy group, a halogen, or a combination of two or more thereof.

28. The process of claim 20, wherein organic functional moiety is derived from a polyalkylene glycol alkyl ether chosen from polyethylene glycol monomethyl ether, polyethylene glycol monoethyl ether, polyethylene glycol monoisopropyl ether, polyethylene glycol monobutyl ether, polyethylene glycol monooctyl ether, polyethylene glycol monodecyl ether, polyethylene glycol monohexadecyl ether, polyethylene glycol monooctadecyl ether, polypropylene glycol monomethyl ether, polypropylene glycol monoethyl ether, polypropylene glycol monoisopropyl ether, polypropylene glycol monobutyl ether, polypropylene glycol monooctyl ether, polypropylene glycol monodecyl ether, polypropylene glycol monohexadecyl ether, polypropylene glycol monooctadecyl ether, or a combination of two or more thereof.

29. The process of claim 20, wherein the base catalyst comprises a surfactant chosen from a polyglycol, an alkylene oxide, a cyclic hydrocarbon, a linear or branched aliphatic hydrocarbon having carbon numbers from 5 to 12 and alkyl derivatives thereof, or combinations of two or more thereof or a combination thereof.

30. The process of claim 20, comprising adding a highly polar material to the organic-inorganic hybrid material.

31. The process of claim 20, wherein the base catalyst is added to maintain a pH of 2 to about 12.

32. The process of claim 20, wherein the solution of (ii) is adjusted to maintain a pH of at least 3 and a temperature of at least 2° C.

33. The process of claim 20, wherein the solution of (ii) is adjusted to have a pH of at least 7.

34. The process of claim 20, wherein the solution of (ii) is adjusted to maintain a pH of at least 7 and a temperature of at least 5° C.

35. The process of claim 20 further comprising subjecting the organic-inorganic hybrid material to temperature conditions to remove volatile components from the material prior to particle formation.

36. The process of claim 35 wherein from about 2% to about 100% of the volatile components are removed from the material.

37. The process of claim 20, wherein the hydrogel particles have a mono-modal particle size distribution of from about 1 micron to about 120 microns.

38. The process of claim 20, wherein the hydrogel particles have a surface area of from about 5 $m^2$/gram to about 1000 $m^2$/gram.

39. The process of claim 20, wherein the hydrogel particles have a surface area of from about 20 $m^2$/gram to about 700 $m^2$/gram.

40. The process of claim 20, wherein the hydrogel particles have a surface area of from about 100 $m^2$/gram to about 500 $m^2$/gram.

41. The process of claim 20, wherein the functional organometal material comprises a functional group that is responsive to an external stimulus such that the organic-inorganic hybrid material exhibits a change in a property of the organic-inorganic hybrid material upon exposure to the external stimulus.

42. The process of claim 41, wherein the property change is swelling, light absorption, light reflection, index of refraction, electrical conductivity, or a combination of two or more thereof.

43. The process of claim 42, wherein the property change results from exposure to an aqueous medium, a non-polar medium, or a polar medium.

44. The process of claim 43, wherein the property change is in response to a change in the medium's concentration, pH, temperature, presence of a specific ion, or two or more thereof.

45. The process of claim 44, wherein the organic-inorganic hybrid material further comprises a crosslinker disposed therein.

46. The process of claim 45, wherein the crosslinker is chosen from an acrylic, a urethane, an isocyanate, a vinyl, an epoxy, an oxirane, or a combination of two or more thereof.

47. The process of claim 20, wherein the hydrogel particles comprise about 5 percent by weight or greater of organic material.

48. The process of claim 47, wherein the particles comprise about 15 percent by weight or greater of organic material.

49. Particles formed by the process of claim 1.

50. The particles of claim 49 having an average pore size of from about 20 angstroms to about 2000 angstroms.

51. The particles of claim 49 comprising macropores of about 0.25 micron or greater.

52. Particles formed by the process of claim 20.

53. The particles of claim 52 having an average pore size of from about 20 angstroms to about 2000 angstroms.

54. The particles of claim 52 comprising macropores of about 0.25 micron or greater.

* * * * *